United States Patent
Dahod

(10) Patent No.: US 9,338,687 B2
(45) Date of Patent: May 10, 2016

(54) QUALITY OF SERVICE DETERMINATION BASED ON UPSTREAM CONTENT SOURCE

(71) Applicant: Cicso Technology, Inc., San Jose, CA (US)

(72) Inventor: Ashraf M. Dahod, Andover, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/467,973

(22) Filed: Aug. 25, 2014

(65) Prior Publication Data

US 2015/0071058 A1   Mar. 12, 2015

Related U.S. Application Data

(63) Continuation of application No. 13/723,543, filed on Dec. 21, 2012, now Pat. No. 8,817,618, which is a continuation of application No. 12/122,522, filed on May 16, 2008, now Pat. No. 8,339,954.

(51) Int. Cl.
*H04W 28/02* (2009.01)
*H04W 28/24* (2009.01)
(Continued)

(52) U.S. Cl.
CPC ....... *H04W 28/0268* (2013.01); *H04L 12/5695* (2013.01); *H04L 47/10* (2013.01); *H04L 47/12* (2013.01); *H04L 47/14* (2013.01); *H04L 47/20* (2013.01); *H04L 47/2433* (2013.01); *H04L 47/2458* (2013.01); *H04L 47/748* (2013.01); *H04L 47/808* (2013.01); *H04L 47/824* (2013.01); *H04W 28/24* (2013.01); *H04W 64/00* (2013.01); *H04W 8/082* (2013.01)

(58) Field of Classification Search
None
See application file for complete search history.

(56) References Cited

U.S. PATENT DOCUMENTS 7,613,836 B2   11/2009   Tober et al.
7,907,616 B1   3/2011   Breau et al.
(Continued)

FOREIGN PATENT DOCUMENTS

CN   102027713   4/2011
EP   1393497   3/2004
(Continued)

OTHER PUBLICATIONS

PCT Jun. 24, 2009 International Search Report from International Application No. PCT/US2009/043696.
(Continued)

*Primary Examiner* — Ashley Shivers
(74) *Attorney, Agent, or Firm* — Patent Capital Group

(57) ABSTRACT

Systems and methods for providing trigger based dynamic changes to a packet flow in a communication network are described. The trigger based dynamic changes can include upgrading and downgrading quality of service (QoS), processing the packet flow, and providing services to the packet flow. These changes can be provided by inspecting packets at a gateway for trigger conditions and setting up a proxy instance for the packet flows. The proxy can coordinate QoS changes and management of packet flows. The triggers can be based on the destination of the packet, for example, the uniform resource locator (URL) and/or by the services (e.g., email, video, messaging) that the subscriber is accessing. The triggers can also be based on the identity of the user or agreements a provider might have with an operator of network equipment for users accessing the provider's website.

26 Claims, 7 Drawing Sheets

(51) Int. Cl.
*H04L 12/54* (2013.01)
*H04L 12/801* (2013.01)
*H04L 12/813* (2013.01)
*H04L 12/851* (2013.01)
*H04L 12/833* (2013.01)
*H04L 12/911* (2013.01)
*H04L 12/927* (2013.01)
*H04W 64/00* (2009.01)
*H04W 8/08* (2009.01)

(56) References Cited

U.S. PATENT DOCUMENTS

| | | | |
|---|---|---|---|
| 8,339,954 | B2 | 12/2012 | Dahod |
| 8,817,618 | B2 | 8/2014 | Dahod |
| 2002/0062379 | A1 | 5/2002 | Widegren et al. |
| 2003/0048751 | A1 | 3/2003 | Han et al. |
| 2004/0095889 | A1* | 5/2004 | Chang et al. .................. 370/238 |
| 2004/0203658 | A1 | 10/2004 | Narayanan |
| 2004/0223602 | A1 | 11/2004 | Honkasalo et al. |
| 2005/0190755 | A1* | 9/2005 | Singh et al. .................. 370/389 |
| 2007/0036078 | A1 | 2/2007 | Chowdhury et al. |
| 2007/0036079 | A1 | 2/2007 | Chowdhury et al. |
| 2007/0047527 | A1* | 3/2007 | Croak et al. .................. 370/356 |
| 2007/0058561 | A1* | 3/2007 | Virgile .......................... 370/252 |
| 2007/0192863 | A1 | 8/2007 | Kapoor et al. |
| 2007/0195788 | A1* | 8/2007 | Vasamsetti et al. ...... 370/395.21 |
| 2007/0206617 | A1 | 9/2007 | Andreasen et al. |
| 2007/0253371 | A1 | 11/2007 | Harper et al. |
| 2008/0020775 | A1 | 1/2008 | Willars |
| 2008/0052387 | A1 | 2/2008 | Heinz et al. |
| 2008/0095339 | A1 | 4/2008 | Elliott et al. |
| 2008/0132268 | A1* | 6/2008 | Choi-Grogan et al. .... 455/550.1 |
| 2008/0137541 | A1 | 6/2008 | Agarwal et al. |
| 2008/0293436 | A1* | 11/2008 | Fok et al. .................... 455/456.2 |
| 2009/0109845 | A1 | 4/2009 | Andreasen et al. |
| 2009/0225762 | A1 | 9/2009 | Davidson et al. |
| 2009/0276801 | A1 | 11/2009 | Reece |
| 2009/0285225 | A1 | 11/2009 | Dahod |

FOREIGN PATENT DOCUMENTS

| | | |
|---|---|---|
| EP | 2277283 | 1/2011 |
| WO | WO2007/103484 | 9/2007 |
| WO | WO2009/140325 | 11/2009 |

OTHER PUBLICATIONS

PCT Nov. 17, 2010 International Preliminary Report on Patentability from U.S. Application Serial No. PCT/US2009/043696.

EPO—Mar. 6, 2013 Extended Search Report and Written Opinion from European Application Serial No. 09747409.

* cited by examiner

QUALITY OF SERVICE DETERMINATION BASED ON UPSTREAM CONTENT SOURCE

CROSS-REFERENCE TO RELATED APPLICATIONS

This application is a continuation of application Ser. No. 13/723,543, filed Dec. 21, 2012 which is a continuation of application Ser. No. 12/122,522, filed May 16, 2008, now U.S. Pat. No. 8,339,954, both of which are incorporated herein by reference in their entirety.

FIELD OF THE DISCLOSURE

This disclosure relates to a system and method for providing trigger based dynamic changes to packet flows in a communication network.

BACKGROUND

Wireless communication systems and networks are used in connection with many applications, including, for example, satellite communications systems, portable digital assistants (PDAs), laptop computers, and cellular telephones. One significant benefit that users of such applications obtain is the ability to connect to a network (e.g., the Internet) as long as the user is within range of such a wireless communication system.

Current wireless communication systems use either, or a combination of, circuit switching and packet switching in order to provide mobile data services to a mobile node. A mobile node can be a cell phone, a PDA, a Blackberry, a laptop computer with a wireless card, or any other wireless device. Generally speaking, with circuit-based approaches, wireless data is carried by a dedicated (and uninterrupted) connection between the sender and recipient of data using a physical switching path. Once the direct connection is setup, it is maintained for as long as the sender and receiver have data to exchange. The establishment of such a direct and dedicated switching path results in a fixed share of network resources being tied up until the connection is closed. When the physical connection between the sender and the receiver is no longer desired, it is torn-down and the network resources are allocated to other users as necessary.

Packet-based approaches, on the other hand, do not permanently assign transmission resources to a given call, and do not require the setup and teardown of physical connections between a sender and receiver of data. In general, a data flow in packet-based approaches is "packetized," where the data is divided into separate segments of information, and each segment receives "header" information that may provide, for example, source information, destination information, information regarding the number of bits in the packet, priority information, and security information. The packets are then routed to a destination independently based on the header information. The packet flow may include a number of packets or a single packet. Services may be applied to a packet flow such as lawful interception (wire tapping), Virtual Private Networks (VPNs), and firewalls.

Packet based communications have also developed to include an IP Multimedia Subsystem (IMS). IMS is an architectural framework for delivering internet protocol (IP) multimedia to mobile nodes. A call session control function (CSCF) can manage much of the signaling that occurs in an IMS core. The CSCF functionality can be logically divided into three functionalities: a Proxy-CSCF (P-CSCF), an Interrogating CSCF (I-CSCF), and a Serving CSCF (S-CSCF). Additionally, the CSCF functionality is envisioned by two different groups for inclusion in two different topologies: Global System for Mobile Communications (GSM) and CDMA 2000. The $3^{rd}$ Generation Partnership Project (3GPP) is responsible for IMS which works with GSM systems and the $3^{rd}$ Generation Partnership Project 2 (3GPP2) is responsible for Multimedia Domain (MMD) which is used with CDMA systems and is based on the 3GPP IMS concept.

Another aspect gaining prominence is Quality of Service (QoS) as networks are looking to guarantee levels of service to a user for running applications such as VoIP, streaming media, gaming, etc. to a mobile node. QoS typically works by providing a certain level of bandwidth to a data flow at a certain point in the delivery process. This works well on wireline networks where the transmission of information is fairly constant. However, where the transmission medium is not as certain, QoS can fail to provide the actual level of service to the user depending on conditions such as interference or fading.

DETAILED DESCRIPTION

Systems and methods for trigger based dynamic management of a packet flow in a communication network are disclosed in some embodiments. A gateway may be used to implement quality of service (QoS) on packet flows in IP multimedia subsystem (IMS) and multimedia domain (MMD) architectures. QoS enforcement and the dynamic application of QoS can be provided by a combination of hardware and software. Residing within the gateway can be one or more network processing units, line cards, as well as packet and voice processing cards. QoS typically works by providing a certain level of bandwidth to a data flow at a certain point in the delivery process. For example, guaranteeing a certain bandwidth at a packet data serving node (PDSN) or similar networking equipment. In certain embodiments, QoS is dynamically provided in IMS and MMS topologies on a per subscriber basis through the use of triggers. The trigger can be a rule regarding a destination such as a uniform resource locator (URL) and/or a service (e.g., email, video, messaging) the subscriber is accessing. The rule can be used to change the QoS and/or traffic management provided by the gateway.

Figure 1:
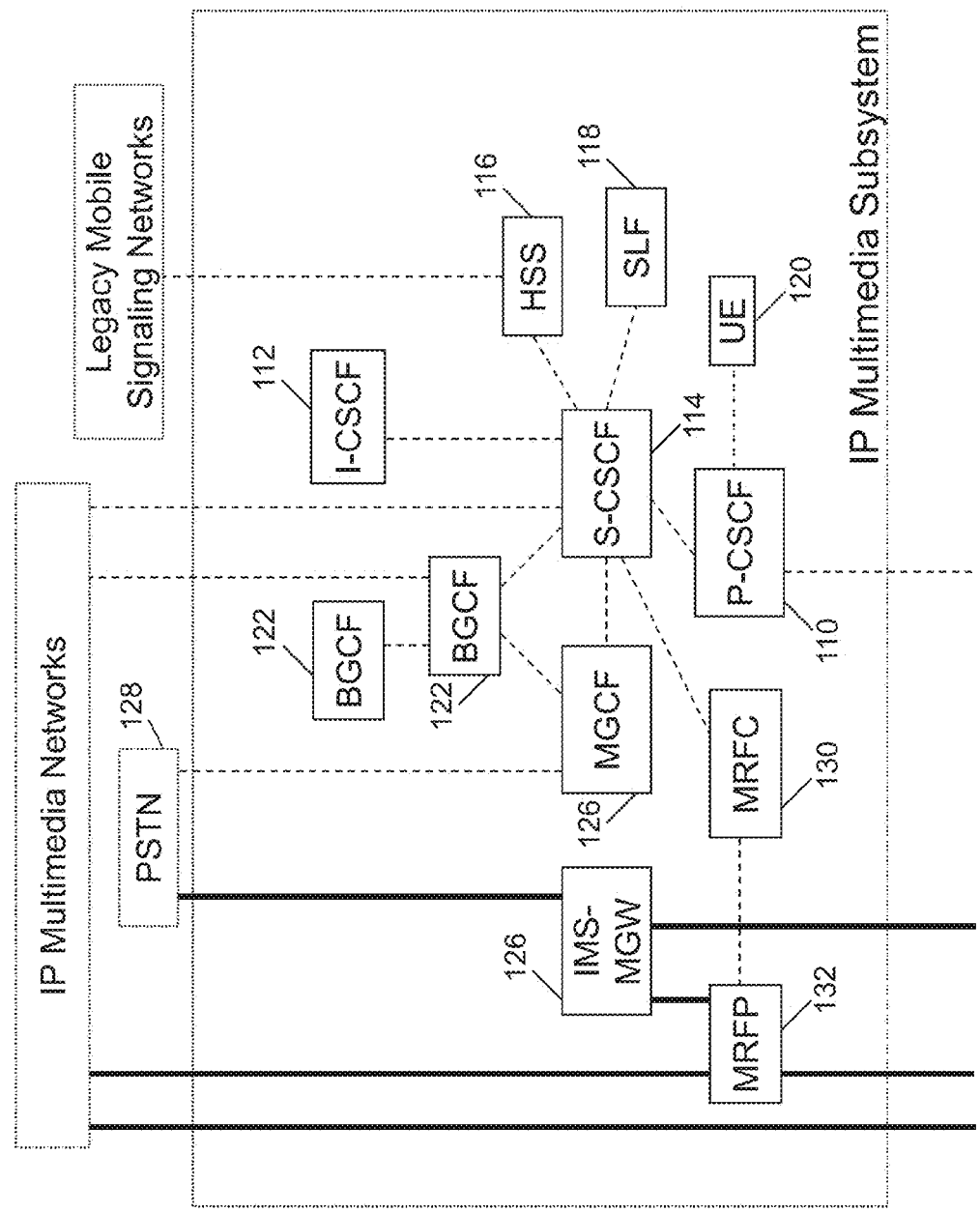
FIG. 1 is a block diagram illustrating an IP multimedia subsystem (IMS) architecture in accordance with certain embodiments.

FIG. 1 illustrates an IP multimedia subsystem (IMS) where logical components of a network setup are shown in accordance with some embodiments. FIG. 1 includes a P-CSCF 110, an I-CSCF 112, a S-CSCF 114, a Home Subscriber Server (HSS) 116, a Subscriber Location Function (SLF) 118, User Equipment (UE) 120, Breakout Gateway Control Function (BGCF) 122, Media Gateway Control Function (MGCF) 124, Media Gateway (MGW) 126, Public Switched Telephone Network (PSTN) 128, Multimedia Resource Controller (MRFC) 130, and Multimedia Resource Function Processor (MRFP) 132. HSS 116 is a master user database that supports the S-CSCF or other network entities that handle calls and sessions. HSS 116 stores subscription-related information such as user profiles, performs user authentication and authorization, and can provide information about the physical location of the user. When multiple HSSs are used in a network a SLF 118 can be used to direct the queries to HSS 116 storing the information. Legacy signaling networks may also use the HSS for services. MRFC 130 communicates with S-CSCF 114 and controls the MRFP 132 to implement media related functions. The combination of MRFC 130 and MRFP 132 provides a source of media in the home network. BGCF 122 is a server that can route based on telephone number and is used when calling to a phone on the circuit switched network. MGCF 124 and MGW 126 are used to convert signaling from IMS to signaling that is appropriate for PSTN 128 circuit switched networks. The IP Multimedia Subsystem network can include application servers and other network entities that provide services to user equipment (or mobile node) 120.

Figure 2:
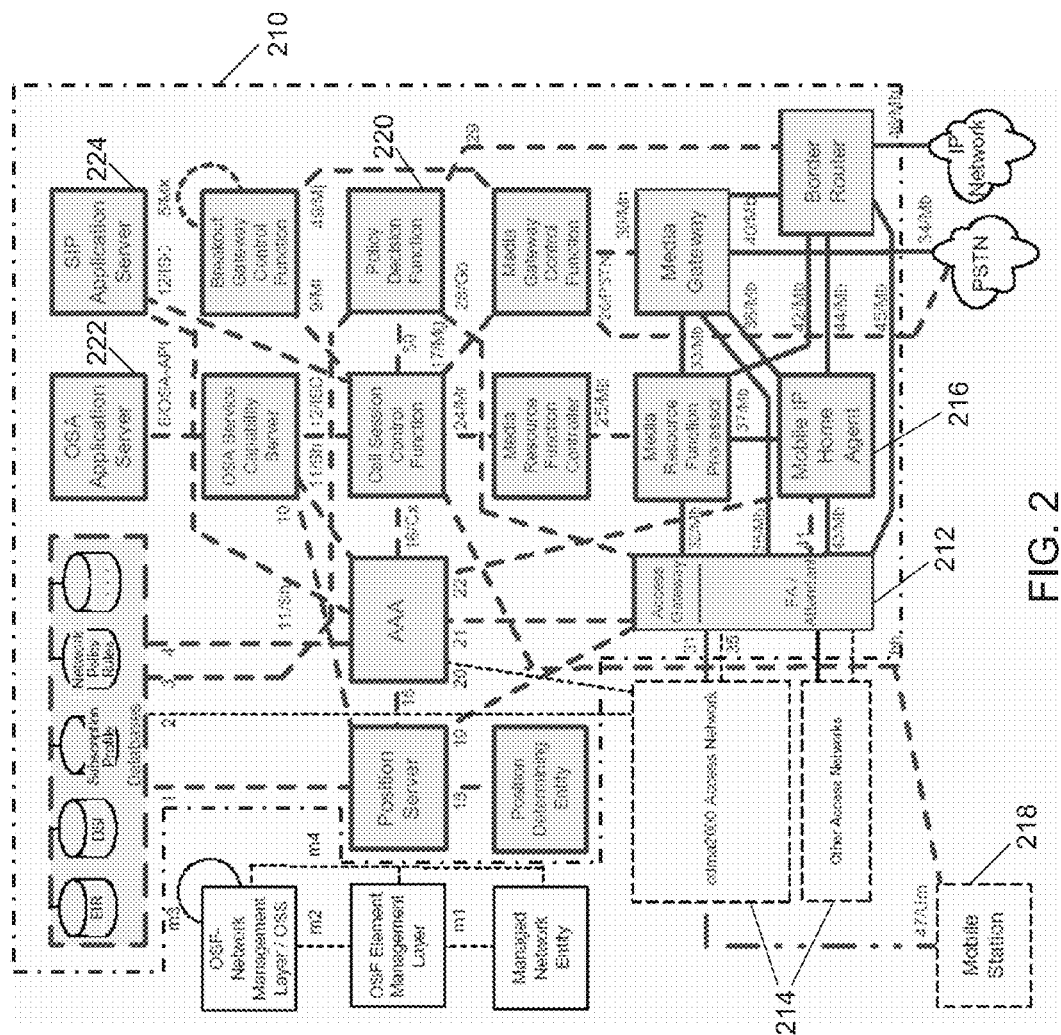
FIG. 2 is a block diagram illustrating a multimedia domain (MMD) architecture in accordance with certain embodiments.

FIG. 2 illustrates a Multimedia Domain (MMD) system 210 within a larger network. The MMD system 210 includes many of the same functions as the IMS system of FIG. 1, but further includes an access gateway/foreign agent 212 to communicate with access networks 214, as well as a home agent 216 to provide Mobile IP support to mobile stations 218 (or mobile node). A policy decision function (PDF), which can be included in a IMS or MMD network stores policies governing a user's session. Application servers such as an open systems architecture (OSA) application server 222 and SIP application server 224 provide applications such as location based services, video, email, chat, gaming, and other data and multimedia content.

As shown in FIGS. 1 and 2 a number of functions can be included in IMS and MMD topologies. Several of these functions are used in providing, for example, voice over IP (VoIP) routing and enhanced services, such as enhanced charging, stateful firewalls, traffic performance optimization (TPO). In some embodiments, one or more of these functions can be provided by a single entity in the network such as a gateway. The IMS and MMS topologies also allow provision of applications such as VoIP, streaming video, streaming music, mutli-user gaming, location based services, and a variety of content delivered to a mobile node.

Figure 3:
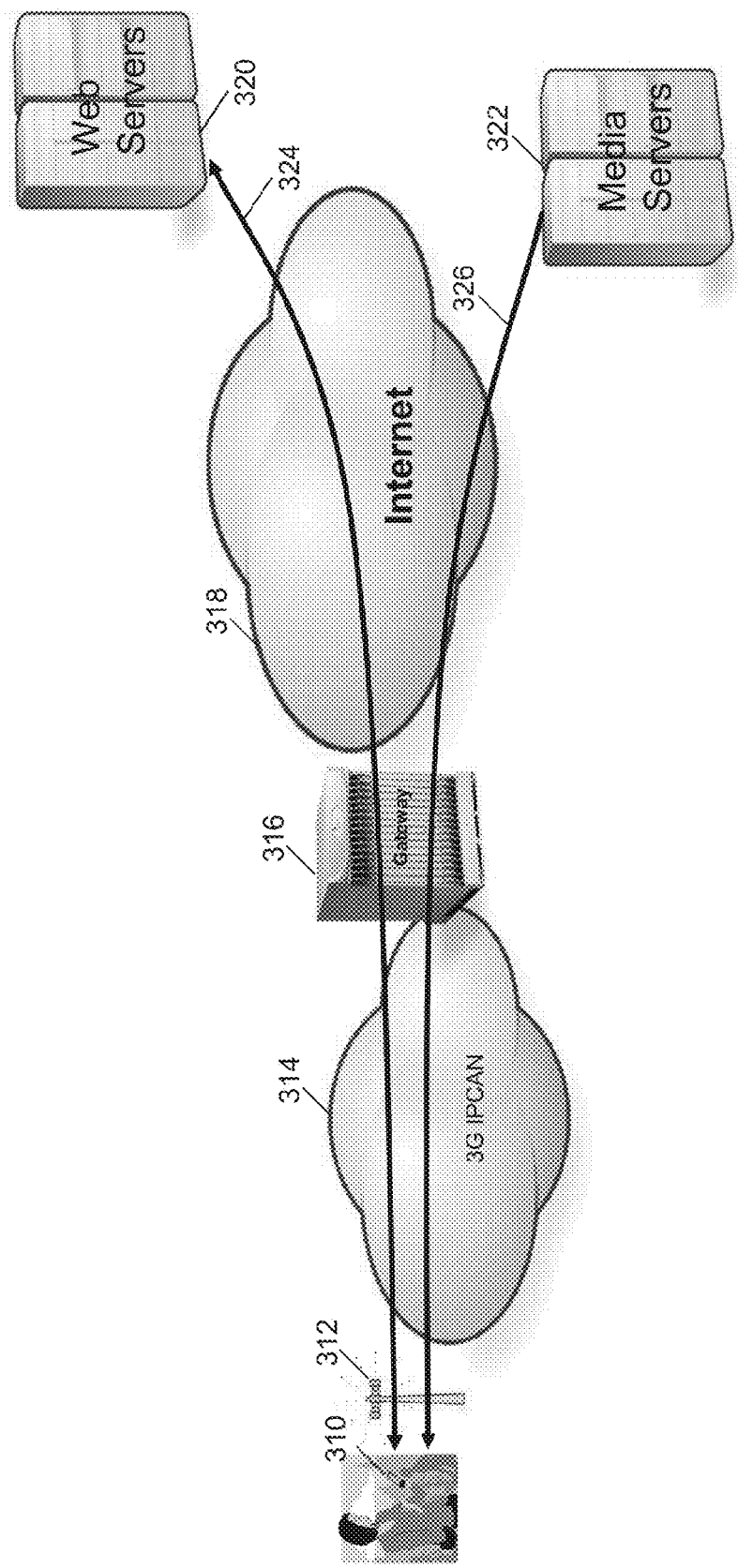
FIG. 3 is a block diagram illustrating a gateway and a communication network in accordance with certain embodiments.

FIG. 3 illustrates packet communication with a mobile node in accordance with certain embodiments. FIG. 3 includes a mobile node 310, a radio access network (RAN), an IP carrier access network (IPCAN) 314, a gateway 316, Internet 318, web servers 320, and media servers 322. Gateway 316 can be a packet data serving node (PDSN), a gateway GPRS support node (GGSN), or any other applicable network equipment. A user can request content on their mobile node 310 with a HTTP request description message 324 in some embodiments. The HTTP request description message 324 can be for retrieving information from various destinations such as google.com, ebay.com, etrade.com, nytimes.com, and abc.go.com. When a request is received at gateway 316 for a subscriber including particular destination, gateway 316 can use certain destinations to trigger quality of service (QoS) and traffic management that is particular to that destination and that subscriber. Gateway 316 may also modify packet information to process and provide services based on the destination information. Mobile node 310 can send a request 326 (such as a real-time streaming protocol (RTSP) request) to media servers 322 to request video, audio, or other content. Gateway 316 can provide dynamic QoS changes and can provide processing on a packet flow based on a trigger of the content or services accessed by a subscriber.

The trigger for the dynamic QoS changes can be based on the provider of the content or services. For example, the operator of gateway 316 can enter into an agreement with a provider, such as Amazon.com, that users accessing the site from a mobile node are provided a certain level of access. This certain level of access can be provided regardless of the user's service level agreement with the operator in some embodiments. The certain level of access can include providing a higher QoS to the user than the user is subscribed to receive, providing higher bandwidth to the user that is accessing that provider's content, or providing better than best effort. A provider may desire to enter into an agreement with the operator of gateway 316 to provide a certain level of service that is better to users accessing their content than the users would normally receive to attract users. A user of a mobile node might be more inclined to use one website or over another website because the experience is going to be quicker and more enjoyable. The agreement can entail the provider compensating the operator of the gateway.

The trigger can also be based on a plurality of information. In some embodiments, an algorithm is used that assigns a weight to the website/IP address or content that is being accessed, the identified user of the mobile device, the location the access is occurring from, and/or the time of day. The IP address can be supplied by the destination IP address in the packet header. The identification of the user can be provided by a user id, a network access identifier (NAI), a mobile node identifier (MSID), or a subscriber identity module (SIM) card identifier. The location information can be provided from GPS information sent by the mobile node or information such as the cell id, which provides the attachment point for the mobile node. The time information can be provided by a timestamp in the packet header.

A trigger may be used, for example, by a corporate customer that wants to provide better than best effort or a higher level of QoS for accessing the corporate intranet or company email, but does not care about access speeds for other information as much. The location can also be used as a factor because customers may want to pay more to have better than best effort in their home network or residential location. The trigger information can also be used to target certain customers that access certain providers. For example, a provider might want to provide better access to corporate customers or users accessing the site from a certain location. The provider may want to attract users in California, for example, so the provider agrees with the operator to give users accessing the content from California better than best effort. The algorithm can also be configured to relate to a variety of levels of access. For example, a corporate customer that is accessing the company's intranet during working hours could be provided the highest bandwidth possible, while the same corporate customer during non-working hours could be provided a lower bandwidth. If the corporate customer was accessing a non-work related website during non-work hours, the customer would be provided best effort.

Figure 4:
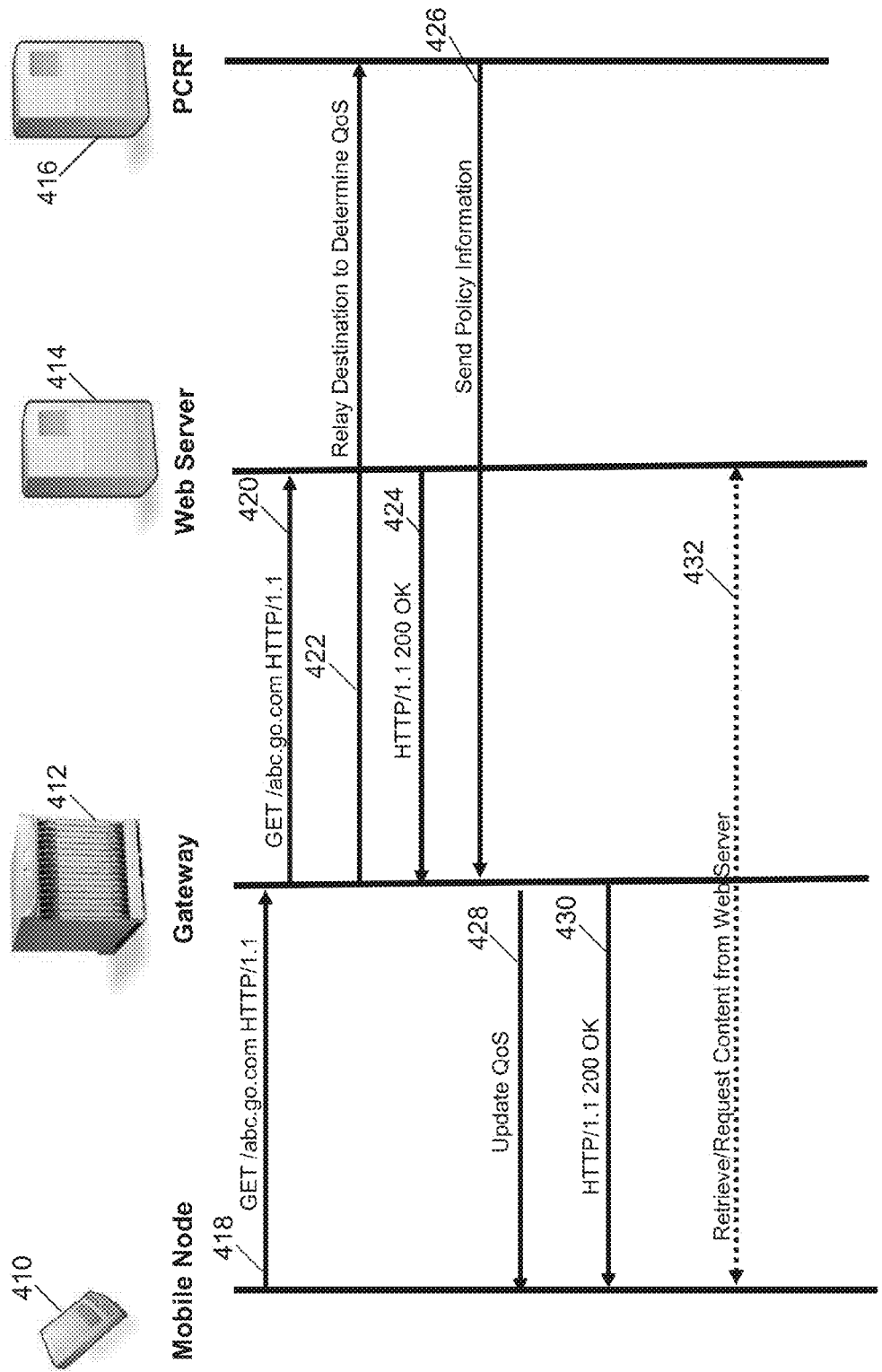
FIG. 4 is a signaling flow illustrating signaling involved with providing trigger based traffic management in accordance with certain embodiments.

FIG. 4 illustrates a signaling diagram of communication involved in providing trigger based QoS and traffic management in accordance with certain embodiments. FIG. 4 includes a mobile node 410, a gateway 412, a web server 414, and a policy control resource function (PCRF) 416. Mobile node 410 sends a get message 418 to gateway 412 to get content specified by the subscriber, such as website abc.go.com. Gateway 412 forwards get message 420 to the appropriate web server 414. The message may be modified by gateway 412 for content to be routed through certain software modules or arrive at certain ports of gateway 412. Gateway 412 can also relay destination information or other triggers such as service triggers to PCRF 416 to determine the appropriate quality of service (QoS) or traffic management and send the appropriate policy information to gateway 412.

Web server 414 sends a HTTP 200 OK message 424. This message can include various information including the resource, if for example, the resource is hypertext markup language (HTML) and some pictures. At about the same time, PCRF 416 sends policy information to gateway 412 regarding QoS and traffic management in message 426. Gateway 412 can use the policy information to update or negotiate QoS with mobile node 410 in message 428. Gateway 412 can also provide services and management functions to any packet flow between web server 414 and mobile node 410 based on the policy information received from PCRF 416. In message 430, information sent from web server 414 is sent to mobile node 410. Communication between mobile node 410 and web server 414 can continue with messaging 432 at the updated QoS and possibly with traffic management features enabled by the triggers. When the session is completed or a new trigger is obtained the policies can be updated at the gateway.

The triggers can be information in a URL, the file type of content requested or sent, the messaging format or header information, or the applications used to provide a service, such as email or instant messaging, for example. In one example, a user might access streaming media to watch a video. The gateway can be used to detect the streaming media request, for example, an real time streaming protocol (RTSP) or real-time protocol (RTP) packets to trigger an appropriate QoS or inline service for the subscriber. The inline service can be provided in-line to the packet flow within the gateway in some embodiments. The trigger rule can be set to detect media containers used to transport the streaming media, such as 3GP, MPEG-x, AVI, MOV, WAV, Realmedia, AIFF, XMF, IFF, ASF, DVR-MS, Ogg, OGM, NUT, MXF, ratDVD, SVI, VOB, DIVX, and any other applicable media containers. If there is a match with the rule, then a specified QoS or inline service can be provided. Besides setting the QoS for the packet flow based on the trigger, other processing within the gateway can be implemented. For example, the gateway can also perform transcoding inline on the media stream, depending on the trigger and any policy instructions received. The transcoding can involve adding redundancy, interleaving, or possibly error correcting codes depending on the mobile node. The gateway in some embodiments can increase the bandwidth allocated to the mobile node and use the additional bandwidth to transcode the streaming media received from a media server.

A sample message flow is provided as an example of how some embodiments are implemented. Deep packet inspection (DPI) rules are activated or installed to detect triggers in packet flows. An example of a get message 418 sent from mobile node 410 via gateway 412 to web server 416 is shown below:
GET/lost.sdp HTTP/1.1
Host: www.abc.go.com
Accept: application/sdp Gateway 412 can detect a trigger such as abc.go.com. With message 424, web server 416 sends via gateway 412 a 200 OK message; an example is shown below:
HTTP/1.1 200 OK
Content-Type: application/sdp
v=0
o=−2890844526 2890842807 IN IP4 192.16.24.202
s=RTSP Session
m=audio 0 RTP/AVP 0
a=control:rtsp://mediaserver.com/lost/audio.en
m=video 0 RTP/AVP 31
a=control:rtsp://mediaserver.com/lost/video Gateway 412 can also detect a trigger such as RTSP session messaging, the source (mediaserver.com), or an application (session description protocol (sdp)) in the packet flow and create a proxy instance in some embodiments. The proxy instance can modify message 424 so mobile node sends future messages directly to gateway 412; an example of message 430 is shown below:
HTTP/1.1 200 OK
Content-Type: application/sdp
v=0
o=−2890844526 2890842807 IN IP4 192.16.24.202
s=RTSP Session
m=audio 0 RTP/AVP 0
a=control:rtsp://ST16.inline.trigger-service.com/lost/audio.en
m=video 0 RTP/AVP 31
a=control:rtsp://ST16.inline.trigger-service.com/lost/video As shown in the example messages above, gateway can modify information regarding the content from web server 416 while leaving the content unchanged.

Figure 5:
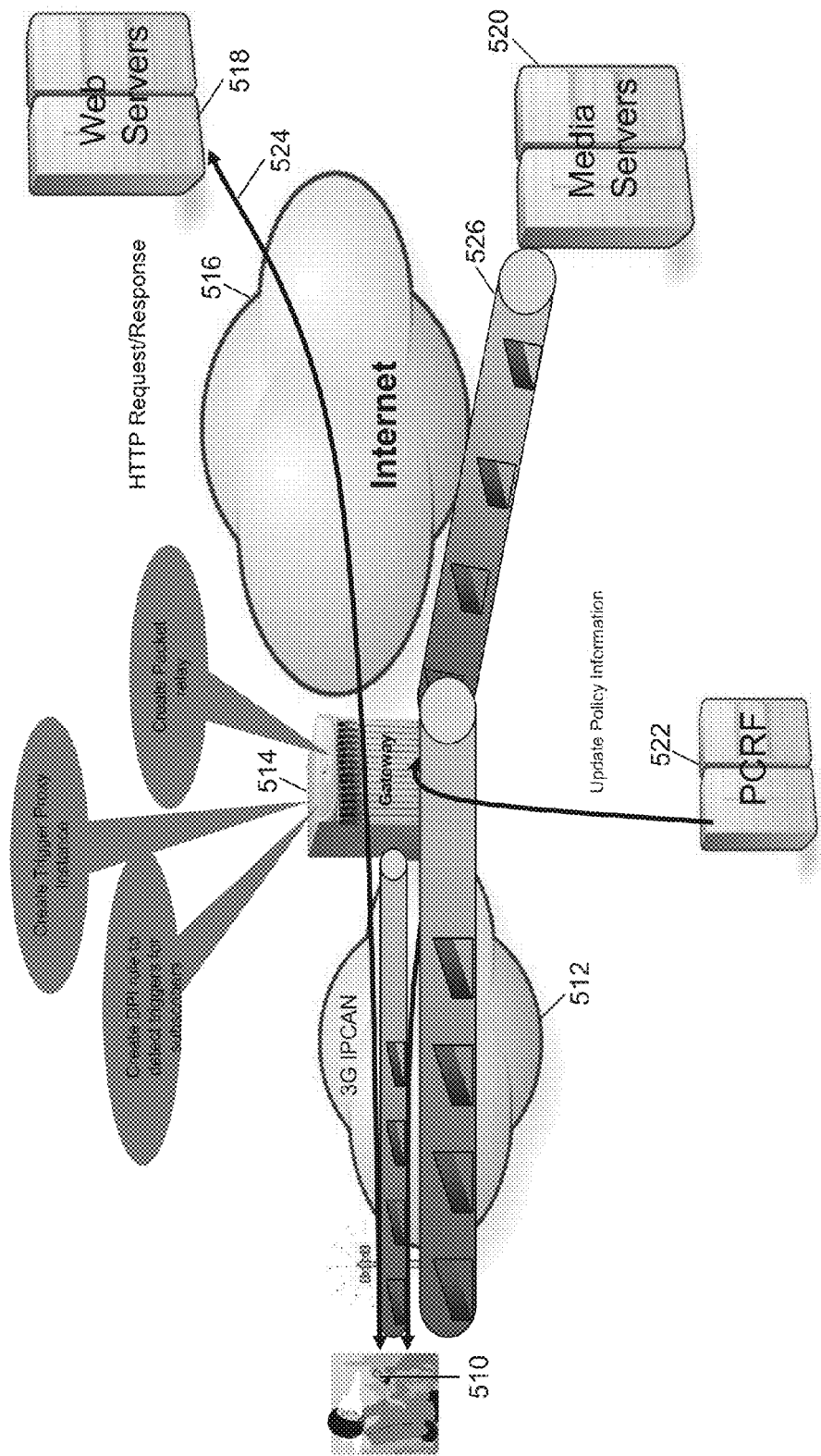
FIG. 5 is a block diagram illustrating provision of trigger based dynamic management of a packet flow in accordance with certain embodiments.

FIG. 5 illustrates providing trigger based quality of service adjustments at an access gateway in accordance with certain embodiments. FIG. 5 includes a mobile node 510, a 3G internet protocol carrier access network (IPCAN) 512, gateway 514, Internet 516, web servers 518, media servers 520, and policy and charging rules function (PCRF) 522. Gateway 514 can utilize deep packet inspection to detect triggers and create a back-to-back user agent (B2BUA) or proxy instance for the packet flow at the gateway. A proxy instance can allow the transcoding and provision of other inline services between call legs on either side of gateway 514. The packet relay along with mobile node 510 can begin a session by communicating with HTTP messaging 524 with web servers 518. At any point, deep packet inspection can detect a trigger that prompts a change in QoS and/or traffic management. Gateway 514 can detect trigger(s) in messaging 526 between mobile node 510 and media servers 520 by inspecting packets.

In some embodiments, gateway sets up a B2BUA instance that can setup a call leg with mobile node 510 and setup a second call leg with media servers 520. Gateway 514 can also create one or more proxy instances. The proxy instances can be setup when deep packet inspection detects a trigger. Gateway 514 can setup the proxy instances to manage packet traffic from media servers 520 to mobile node 510. With gateway 514 in the middle of the packet traffic, the gateway can control the media stream, re-negotiate the provision or parameters of the stream, and can perform processing on the packet stream. The gateway can also relay the packet stream without modifying any packets or packet headers. The gateway can also receive instructions on how and/or when to change management of the packet traffic or the QoS of the packet traffic based on trigger information. These instructions can come from PCRF 522. For example, in FIG. 5, PCRF 522 updates the QoS to mobile node 510. Gateway 514 re-negotiates the packet stream to adapt to the updated QoS.

Figure 6:
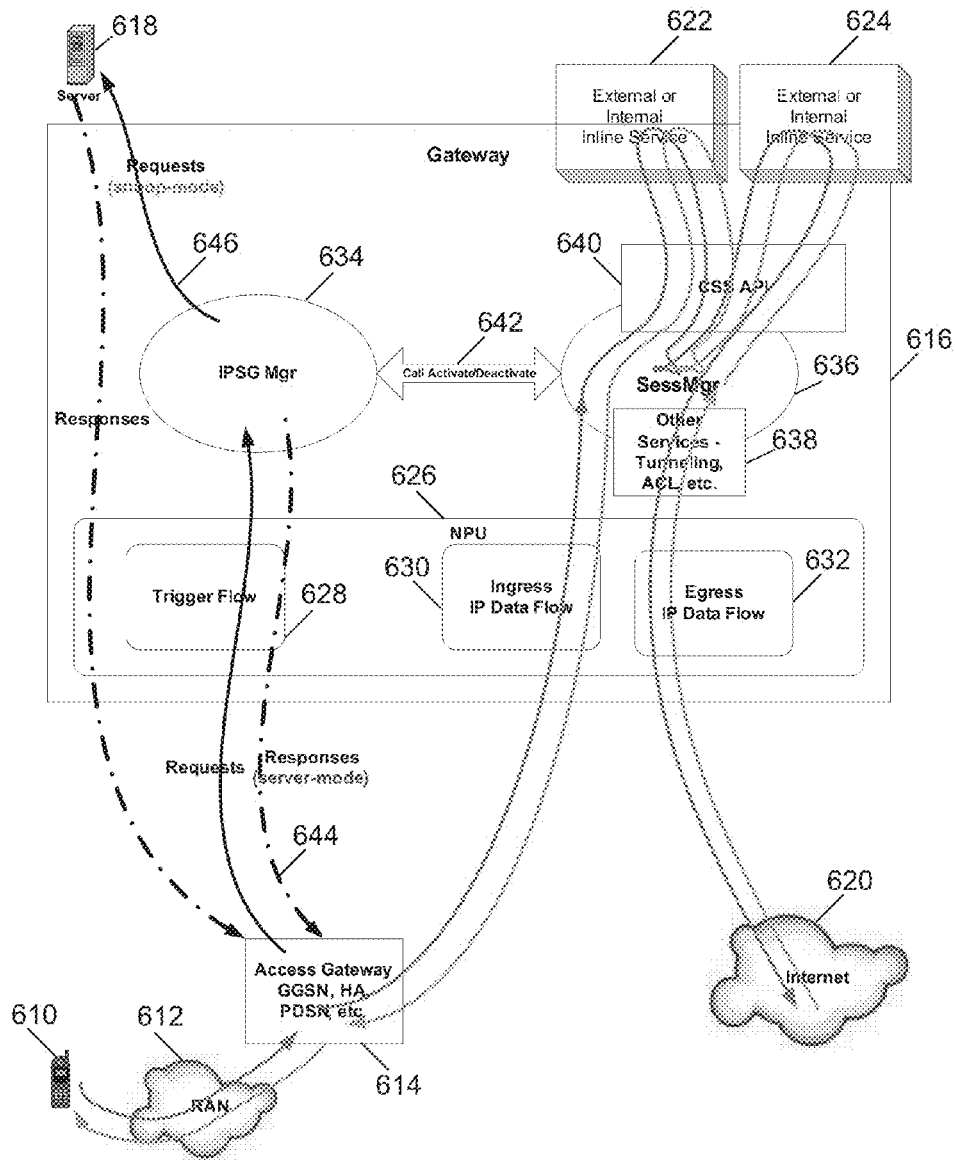
FIG. 6 is a block diagram illustrating mechanisms within a gateway for providing trigger based dynamic management of a packet flow in accordance with certain embodiments.

FIG. 6 illustrates packet flows through a gateway in accordance with some embodiments. FIG. 6 includes a mobile node 610, a radio access network (RAN) 612, an access gateway 614, a gateway 616, a server 618, an internet 620, and an external or internal in-line service 622 and 624. Access gateway 614 and gateway 616 can be the same gateway in certain embodiments. Gateway 616 includes network processing unit (NPU) 626, trigger flow 628, ingress IP data flow 630, egress IP data flow 632, IPSG manager 634, session manager 636, other services module 638, content service steering (CSS) application program interface (API) 640, and module communication 642. RTSP flow 628, Ingress IP data flow 630, Egress IP data flow 632, IPSG manager 634 and session manager 636 can be implemented in software and can be used to provide the services to a packet flow. Trigger flow 628 can be used by IPSG manager 634 to monitor triggers in messaging destined to a server 618. The flow can monitor messages by checking messages for certain information and if message meets certain criteria and sending the message to the IPSG manager or another module for deep packet inspection, in certain embodiments.

The requests are received by the IPSG manager 634 for processing. The IPSG manager 634 inspects the messages to activate and deactivate sessions and to detect trigger conditions based on rules for a particular subscriber in gateway 616. During the inspection of the messages by IPSG manager 634, information is obtained that can be used to setup the session, authenticate the session, and link the session to a subscriber profile. This information can be sent to session manager 636 through module communication 642, which may be implemented in any combination of hardware or software. IPSG manager 634 can setup one or more trigger flows 628 corresponding to the port numbers used by the access gateway 614 when communicating to a media server 618.

IPSG manager 634 can function in at least two modes relating to the handling of messages received from access equipment. In some embodiments, IPSG manager 634 is in a server mode. In server mode, the messages are addressed to gateway 616 and IPSG manager 634 issues responses 644, with gateway 616 implementing a B2BUA or a proxy instance. In other embodiments, IPSG manager 634 is in an inspect mode and the messages are not addressed to the gateway, so the messages are directed to the IPSG manager 634 by NPU 626. At IPSG manager 634, the messages are inspected and information is extracted before the message is forwarded 646. In both modes, the messages are inspected and information is extracted and sent to session manager 636. IPSG manager 634 can inspect setup and teardown messages to activate and deactivate sessions by way of communication module 642.

Session manager 636 can create at least one IP data flow, which can include IP data flows 630 and 632. Egress IP data flow 632 is the more likely to be implemented for streaming media because the stream is provided via a downlink. However, both IP flows can be used when a user is engaged in video telephony or gaming on the mobile node, for example, because both an uplink and downlink are used. Ingress IP data flow 630 indicates to session manager 636 that the packet is coming from mobile node 610 so that session manager 636 can relay the packet or provide inline services such as transcoding. When a packet arrives at egress IP data flow 632, a similar process takes place. Egress IP data flow 632, like ingress IP data flow 630, recognizes packets on a subscriber session basis and forwards the packets to session manager 636 for relaying or providing per-subscriber inline services such as enhanced charging, stateful firewalls, traffic performance optimization (TPO) and advanced services such as content differentiated charging, stateful firewalls, transcoding, and VPN service. When a new session is activated and session manager 636 receives the extracted information from IPSG manager 634, session manager 636 can authenticate the session to load the subscriber profile, in certain embodiments. The authentication can involve the NAI, the MSID, the user name and password, or any other authentication attribute of mobile node 610. The subscriber profile includes configuration information such as the subscriber access control list (ACL), the corresponding CSS redirections, and other services applied for this subscriber. The access control list can be used to implement trigger rules in certain embodiments. When the call is authenticated or authorized, then the dynamic QoS on a per-session basis is setup and data flow begins. The session manager may also authenticate the subscriber with a PCRF so the PCRF can send instructions regarding QoS.

CSS API 640 is a module that defines how packet flows are handled by the gateway based on the content of the packets, which includes information in a packet header. The content service steering (CSS) API 640 includes features such as load balancing, network address translation (NAT), HTTP redirection, and DNS redirection. In some embodiments, the CSS API 640 uses information obtained from the subscriber profile to both select appropriate content service providers (e.g., the in-line service or an external content server) and route the packet flows in a load balanced fashion. The load balancing can be accomplished by a number of algorithms such as round robin, least loaded, destination hashing, and normalized response time monitoring. The CSS API 640 can also monitor the health of external servers through internet control message protocol (ICMP), hypertext transfer protocol (HTTP), transfer control protocol (TCP), and file transfer protocol (FTP) keepalive mechanisms. By monitoring the health of external servers, the CSS API 640 can redirect packet flows if an external server fails. The CSS API 640 can also implement transcoding by redirecting media stream to an DSP card for processing. The CSS API 640 can direct the media stream packet flow to an enhanced charging service (ECS) in conjunction with dynamic quality of service.

Figure 7:
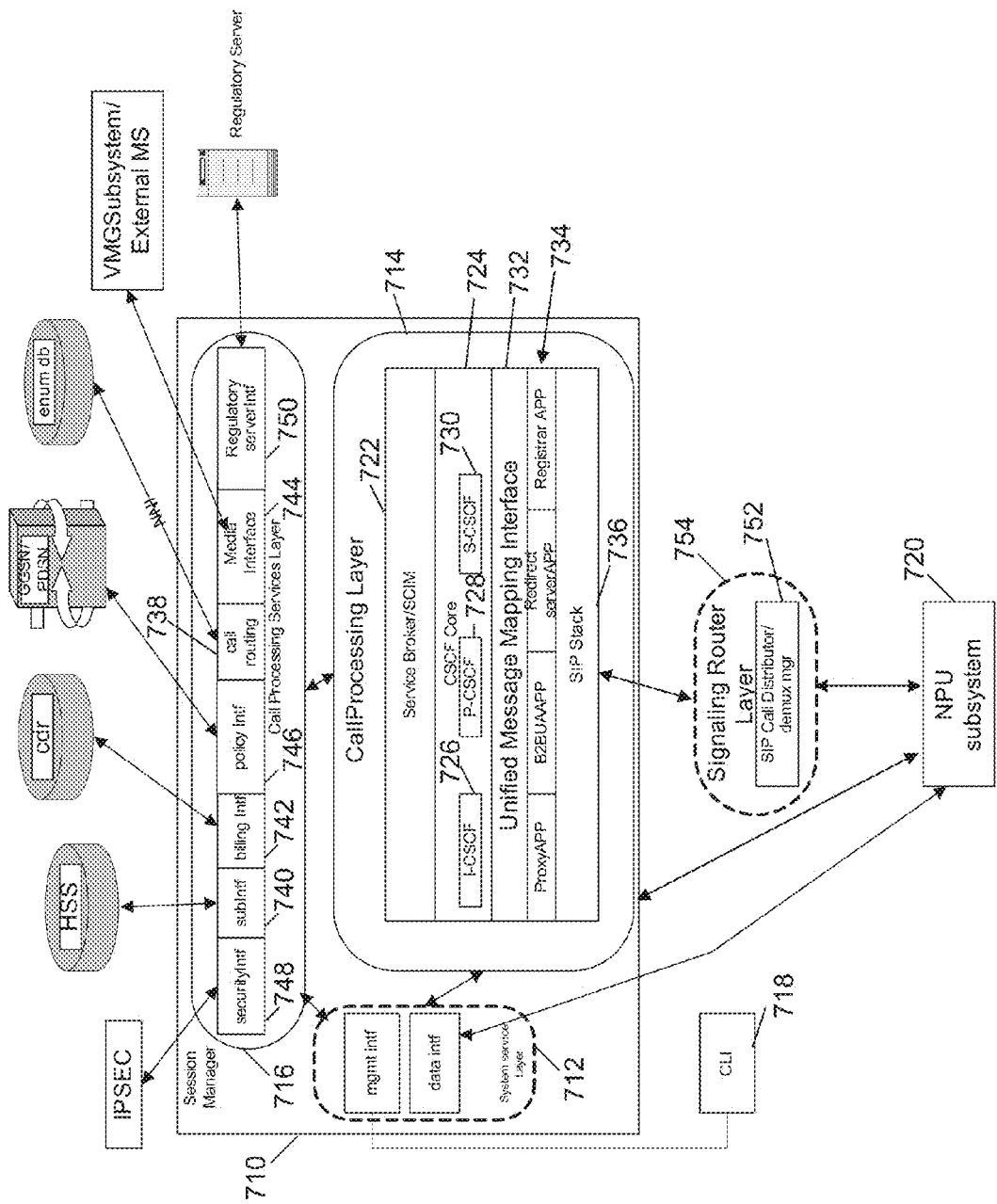
FIG. 7 is a block diagram illustrating modules running on a gateway in accordance with certain embodiments.

FIG. 7 illustrates a control plane architecture that can be used to implement trigger based dynamic QoS in a gateway in accordance with certain embodiments. A session manager 710 services and processes user session data flow for the mobile node. Session manager 710, which is the same session manager as described above, includes functional layers such as a system service layer 712, a call processing layer 714, and a call processing support services layer 716. The system services layer 712 provides an interface for instructions to be passed to the session manager and the other layers. A command line interface (CLI) 718 can be provided. Network processing unit 720 can be used to provide packet flows and for other processing. The call processing layer 714 includes a service broker/Service Control Interaction Manager (SCIM) 722, a CSCF core 724 that includes an I-CSCF 726, P-CSCF 728, and S-CSCF 730, a unified message mapping interface 732, applications 734, and a SIP stack 736. Applications 734 includes a registrar function. The registrar function caches information relating to the subscriber and the session enabling lookup of information without having to query external databases. In some embodiments, the CSCF core includes one of the CSCF functionalities, for example, the P-CSCF. The call processing support services layer 716 includes a variety of services such as routing and address translation service 738, subscriber management service 740, changing interface service 742, media interface service 744, QoS policy interface service 746, security interface 748, and regulatory server interface 750.

Looking at the call processing layer 714, this layer includes signaling protocols and call control using universal SIP as an application program interface (API). The signaling protocols can be SIP or can be other protocols like ISUP, MGCP, or H.323. Further, the call processing layer 714 allows inter-working between SIP variants and other protocols through a unified mapping interface. The unified mapping interface can convert protocol specific messages and parameters to a universal SIP like API format. SIP like messaging is used, in some embodiments, because SIP has the largest message set and can cover the possible messaging scenarios for SIP and the other protocols. The call processing layer 714 can also provide transparency to data that need not be processed by the CSCF core by placing that information into an envelope. Parameters that are not of interest can be placed in an envelope and remain unmodified. The CSCF core allows any text string as the calling and called number, and the number does not need to be restricted to an E.164 number. The number could be, for example, an Address of Record (AoR) or any name string with a domain name.

A demux manager 752 resides in the signal routing layer 754, as shown in FIG. 7. The signal routing layer 754 with the demux manager can determine where a packet flow is sent for processing. The packet flow can be sent to a process instance for further processing and/or signal handling. The demux manager can be used to analyze packet flows or traffic entering into a gateway. This analyzing may encompass packet sniffing, extracting of information from packet headers, sorting extracted information, deep packet inspection, and processing of information obtained from one or more packets. Messages analyzed by a demux manager can contain information which can be extracted (or sniffed) such as an IP-address assigned to the mobile node, a network access identifier (NAI), an international mobile subscriber identity (IMSI), a mobile subscriber identification (MSID), a correlation-ID (for CDMA implementations), a user data record (UDR), event data records (EDR), a calling-station-ID, and/or any other applicable information. In some embodiments, a version of the demux manager can be used as a proxy instance.

The gateway described above is implemented in a chassis in some embodiments. This chassis can implement multiple and different integrated functionalities. In some embodiments, an access gateway, a packet data serving node (PDSN), a foreign agent (FA), or a home agent (HA) can be implemented on a chassis. Other types of functionalities can also be implemented on a chassis in other embodiments are a Gateway General packet radio service Support Node (GGSN), a serving GPRS support node (SGSN), a packet data inter-working function (PDIF), an access service network gateway (ASNGW), a base station, a access network, a User Plane Entity (UPE), an IP Gateway, an access gateway, a session initiation protocol (SIP) server, a proxy-call session control function (P-CSCF), and an interrogating-call session control function (I-CSCF). In certain embodiments, one or more of the above-mentioned other types of functionalities are integrated together or provided by the same functionality. For example, an access network can be integrated with a PDSN. A chassis can include a PDSN, a FA, a HA, a GGSN, a PDIF, an ASNGW, a UPE, an IP Gateway, an access gateway, or any other applicable access interface device. The gateway can also support sessions originated from a Femto base station, which would connect to the gateway using a broadband network. A person or corporation may use a Femto base station in a home or business to support one or more mobile nodes. The gateway can provide trigger based traffic management during a handoff from a Femto base station to a macro base station, while maintain traffic management for the mobile node. In certain embodiments, a chassis is provided by Starent Networks, Corp. of Tewksbury, Mass. in a ST16 or a ST40 multimedia platform.

The chassis can include slots for loading application cards and line cards. A midplane can be used in the chassis to provide intra-chassis communications, power connections, and transport paths between the various installed cards. The midplane can include buses such as a switch fabric, a control bus, a system management bus, a redundancy bus, and a time division multiplex (TDM) bus. The switch fabric is an IP-based transport path for user data throughout the chassis implemented by establishing inter-card communications between application cards and line cards. The control bus interconnects the control and management processors within the chassis. The chassis management bus provides management of system functions such as supplying power, monitoring temperatures, board status, data path errors, card resets, and other failover features. The redundancy bus provides transportation of user data and redundancy links in the event of hardware failures. The TDM bus provides support for voice services on the system.

The chassis supports at least two types of application cards: a switch processor card and a packet accelerator card. The switch processor card serves as a controller of the chassis and is responsible for such things as initializing the chassis and loading software configurations onto other cards in the chassis. The packet accelerator card provides packet processing and forwarding capabilities. Each packet accelerator card is capable of supporting multiple contexts. Hardware engines can be deployed with the card to support parallel distributed processing for compression, classification traffic scheduling, forwarding, packet filtering, and statistics compilations.

The packet accelerator card performs packet-processing operations through the use of control processors and a network processing unit (NPU). The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing. The line cards when loaded in the chassis provide input/output connectivity and can also provide redundancy connections as well.

In some embodiments, a ST40 embodiment of the chassis can support a system management card (SMC) and a packet services card (PSC). The system management card is a system control and management card for managing and controlling other cards in the chassis. The packet services card is a high-speed processing card that provides mutli-threaded point-to-point, packet data processing, and context processing capabilities, among other things.

The operating system software can be based on a Linux software kernel and run specific applications in the chassis such as monitoring tasks and providing protocol stacks. The software allows chassis resources to be allocated separately for control and data paths. For example, certain packet accelerator cards can be dedicated to performing routing or security control functions, while other packet accelerator cards are dedicated to processing user session traffic. As network requirements change, hardware resources can be dynamically deployed to meet the requirements in some embodiments.

The system can be virtualized to support multiple logical instances of services, such as technology functions (e.g., a PDSN, ASNGW, PDIF, HA, GGSN, or IPSG).

The chassis' software can be divided into a series of tasks that perform specific functions. These tasks communicate with each other as needed to share control and data information throughout the chassis. A task is a software process that performs a specific function related to system control or session processing. Three types of tasks operate within the chassis in some embodiments: critical tasks, controller tasks, and manager tasks. The critical tasks control functions that relate to the chassis' ability to process calls such as chassis initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a chassis include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the chassis by monitoring the various software and hardware components of the chassis. Recovery control task subsystem is responsible for executing a recovery action for failures that occur in the chassis and receives recovery actions from the high availability task subsystem. Shared configuration task subsystem provides the chassis with an ability to set, retrieve, and receive notification of chassis configuration parameter changes and is responsible for storing configuration data for the applications running within the chassis. Resource management subsystem is responsible for assigning resources (e.g., processor and memory capabilities) to tasks and for monitoring the task's use of the resources.

Virtual private network (VPN) subsystem manages the administrative and operational aspects of VPN-related entities in the chassis, which include creating separate VPN contexts, starting IP services within a VPN context, managing IP pools and subscriber IP addresses, and distributing the IP flow information within a VPN context. In some embodiments, within the chassis, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards. The session subsystem is responsible for processing and monitoring a mobile subscriber's data flows in some embodiments. Session processing tasks for mobile data communications include: A10/A11 termination for CDMA networks, GSM tunneling protocol termination for GPRS and/or UMTS networks, asynchronous PPP processing, packet filtering, packet scheduling, Difsery codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In some embodiments, the software needed for implementing a process or a database includes a high level procedural or an object-orientated language such as C, C++, C#, Java, or Perl. The software may also be implemented in assembly language if desired. Packet processing implemented in a chassis can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document.

Although the present invention has been described and illustrated in the foregoing embodiments, it is understood that the present disclosure has been made only by way of example, and that numerous changes in the details of implementation of the invention may be made without departing from the spirit and scope of the invention, which is limited only by the claims which follow.

We claim:

1. A gateway comprising:
a processor operable to execute instructions;
one or more interfaces for communicating with a plurality of mobile devices and with an upstream content source via a service provider's network; and
a non-transitory memory storing computer-readable instructions that, when executed by the processor, cause the processor to:
receive packets in a session at the gateway at a first quality of service (QoS) level from the upstream content source and intended for a recipient mobile device of the plurality of mobile devices;
inspect the packets to determine an identity of a mobile subscriber associated with the recipient mobile device, wherein the identity of the mobile subscriber is determined based at least in part from at least one of a network access identifier, a user name and password combination, and a subscriber identity module card identifier;
determine whether to provide a higher QoS level for the session based at least in part on the determined identity of the mobile subscriber; and
based on the determined identity, modify the level of service for the session from the first QoS level to a higher QoS level.

2. The gateway of claim 1, the non-transitory memory further storing instructions that, when executed by the processor, cause the processor to determine a current location of the mobile subscriber associated with the recipient mobile device, wherein the modification of the level of service for the session from the first QoS level to the higher QoS level is based at least in part on the current location of the mobile subscriber.

3. The gateway of claim 2, wherein the processor determines the current location of the mobile subscriber based on at least one of Global Positioning System (GPS) information sent by the recipient mobile device and an attachment point for the recipient mobile device.

4. The gateway of claim 1, wherein the modification of the level of service for the session from the first QoS level to the higher QoS level is based at least in part on a current time of day.

5. The gateway of claim 1, the non-transitory memory further storing instructions that, when executed by the processor, cause the processor to:
receive additional packets in a second session at the gateway at the first QoS level from the upstream content source and intended for a second recipient mobile device of the plurality of mobile devices,
inspect the additional packets to determine a second determined identity of a second mobile subscriber associated with the second recipient mobile device;
determine whether to provide a second higher QoS level for the second session based at least in part on the second determined identity of the second mobile subscriber; and
based on the second determined identity, cause the additional packets to be transmitted with the unchanged first QoS level.

6. The gateway of claim 1, wherein the gateway is functioning as a User Plane Entity.

7. The gateway of claim 1, wherein the identity of the mobile subscriber is determined, based on the user name and password combination.

8. The gateway of claim 1, wherein the modification of the level of service for the session is further based on location information of an attachment point for the recipient mobile device.

9. The gateway of claim 1, wherein the identity of the mobile subscriber is determined based on the subscriber identity module card identifier.

10. The gateway of claim 1, wherein the modification of the level of service for the session from the first QoS level to a higher QoS level is based on policy information from a subscriber profile of the mobile subscriber received from a policy and charging rules function (PCRF) that stores subscriber profiles for the plurality of mobile devices.

11. A method comprising:
receiving packets in a session at a gateway at a first quality of service (QoS) level from an upstream content source via a service provider's network and intended for a recipient mobile device of a plurality of mobile devices;
inspecting the packets to determine an identity of a mobile subscriber associated with the recipient mobile device, wherein the identity of the mobile subscriber is determined based at least in part from at least one of a network access identifier, a user name and password combination, and a subscriber identity module card identifier;
determining whether to provide a higher QoS level for the session based at least in part on the determined identity of the mobile subscriber; and
based on the determined identity, modifying the level of service for the session from the first QoS level to the higher QoS level for the mobile subscriber.

12. The method of claim 11, further comprising determining a current location of the mobile subscriber associated with the recipient mobile device, wherein the modification of the level of service for the session from the first QoS level to the higher QoS level is based at least in part on the current location of the mobile subscriber.

13. The method of claim 12, wherein the determination of the current location of the mobile subscriber is based on at least one of Global Positioning System (GPS) information received from the recipient mobile device and an attachment point for the recipient mobile device.

14. The method of claim 11, further comprising determining a current time of day, wherein the modification of the level of service for the session from the first QoS level to the higher QoS level is based at least in part on the current time of day.

15. The method of claim 11, further comprising:
receiving additional packets in a second session at the gateway at the first QoS level from the upstream content source and intended for a second recipient mobile device of the plurality of mobile devices,
inspecting the additional packets to determine a second determined identity of a second mobile subscriber associated with the second recipient mobile device;
determining whether to provide a second higher QoS level for the second session based at least in part on the second determined identity of the second mobile subscriber; and
based on the second determined identity, causing the additional packets to be transmitted with the unchanged first QoS level.

16. The method of claim 15, wherein the first higher QoS level is equivalent to the second higher QoS level.

17. The method of claim 11, wherein determining the identity of the mobile subscriber is based on the user name and password combination.

18. The method of claim 11, wherein the identity of the mobile subscriber is determined based on the subscriber identity module card identifier.

19. The method of claim 11, wherein modifying the level of service for the session is based on location information of an attachment point for the recipient mobile device.

20. The method of claim 11, wherein modifying the level of service for the session from the first QoS level to the higher QoS level for the mobile subscriber is based on policy information from a subscriber profile of the mobile subscriber received from a policy and charging rules function (PCRF) that stores subscriber profiles for the plurality of mobile devices.

21. A method comprising:
receiving instructions at a gateway to prioritize traffic sent to a first recipient mobile device of a plurality of mobile devices;
receiving a first packet from an upstream content source addressed to the first recipient mobile device in a first session at the gateway;
receiving a second packet from the upstream content source addressed to a second recipient mobile device of the plurality of mobile devices in a second session at the gateway;
determining whether to provide a first higher quality of service for the first packet based on a determined identity of a mobile subscriber associated with the first recipient mobile device, wherein the identity of the mobile subscriber is determined based at least in part from at least one of a network access identifier, a user name and password combination, and a subscriber identity module card identifier;
determining whether to provide a second higher quality of service for the second packet; and assigning the first higher quality of service to the first packet.

22. The method of claim 21, further comprising assigning a default quality of service to the second packet.

23. The method of claim 21, further comprising receiving instructions at the gateway to prioritize traffic addressed to mobile devices within a geographic region;
   determining a first current location of the first recipient mobile device; and
   determining a second current location of the second recipient mobile device;
   wherein the determination of whether to provide the first higher quality of service for the first packet is based at least in part on the determined first current location; and
   wherein the determination of whether to provide the second higher quality of service for the second packet is based at least in part on the determined second current location.

24. The method of claim 23, further comprising assigning the second higher quality of service to the second packet.

25. The method of claim 21, wherein the determination of whether to provide the first higher quality of service to the first packet is based at least in part on a current time of day.

26. The method of claim 21, wherein the first higher quality of service is equivalent to the second higher quality of service.

* * * * *